Nov. 18, 1958 C. BARDONNET ET AL 2,860,516
APPARATUS AND METHOD FOR MEASURING DENSITY
Filed June 27, 1957 2 Sheets-Sheet 1

Inventors
Claude Bardonnet
Roger Commarmot
by Stevens, Davis, Miller & Mosher
their attorneys Nov. 18, 1958  C. BARDONNET ET AL  2,860,516
APPARATUS AND METHOD FOR MEASURING DENSITY
Filed June 27, 1957  2 Sheets—Sheet 2

Inventors
Claude Bardonnet
Roger Commarmot
by Stevens, Davis, Miller & Mosher
their attorneys

United States Patent Office 2,860,516
Patented Nov. 18, 1958

2,860,516

APPARATUS AND METHOD FOR MEASURING DENSITY

Claude Bardonnet and Roger Commarmot, Lyon, France, assignors to Societe des Usines Chimiques Rhone-Poulenc, Paris, France, a French body corporate Application June 27, 1957, Serial No. 668,463

Claims priority, application France June 29, 1956

1 Claim. (Cl. 73—439)

The present invention relates to devices for measuring the density of a liquid by reading a pressure difference.

It is known to measure the density of a liquid by blowing a gas into the liquid with the aid of two pipes, the depths of immersion of which differ by a fixed value. The difference of the blowing pressures is directly proportional to the density of the liquid, and the desired density can therefore be directly deduced by means of a differential pressure gauge.

It has further been proposed to modify the aforesaid device so as to permit accurate measurement of small variations in the density of the liquid tested. For this purpose, there is attached to one of the pipes a vessel, called a "reference vessel," containing a fixed reference liquid through which the gas bubbles before reaching the pipe.

Figure 1:
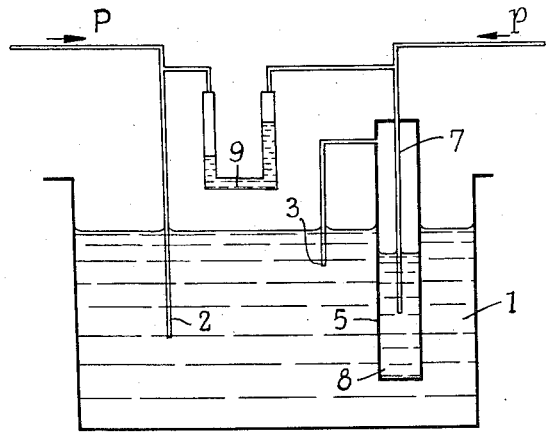
Figure 2:
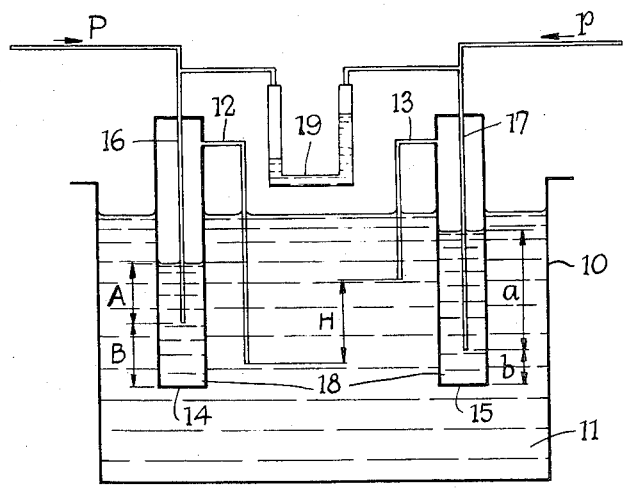
Figure 3:
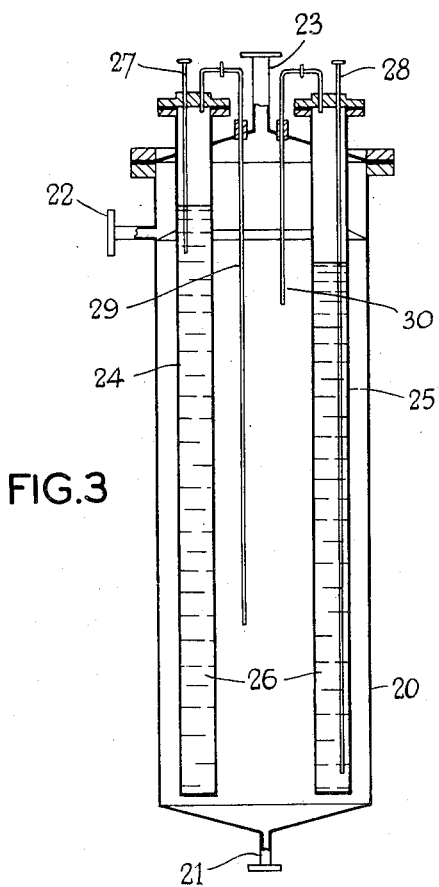

In the accompanying drawings:

Figure 1 is a diagrammatic sectional view of a known device for measuring density which includes such a reference vessel, Figure 2 is a diagrammatic sectional front elevational view of a form of apparatus in acocrdance with the invention, and Figure 3 is a sectional front elevation of a modification of the apparatus shown in Figure 2 wherein the liquid whose density is to be measured is maintained at a constant level.

Referring now to Figure 1, the known device illustrated, which contains a liquid whose density is to be measured, comprises pipes 2, 3 and 7, a reference vessel 5, containing reference liquid 8, and a differential pressure gauge 9.

Taking into account the densities of the liquids used, the depths of immersion of the pipes 2, 3 and 7 can be so chosen that the difference between blowing pressures as read on the pressure gauge 9 is proportional to the variations in the density of the liquid 1 about a mean value, whereby greater precision is obtained.

This method, when applied to the measurement of small differences in density, rapidly becomes insufficiently exact owing to the influence of temperature. The density observed tends to depart considerably from the density which the liquid 1 would have at a fixed temperature, therefore values observed are not strictly comparable. The necessary correction has been made in some constructions by modifying the differential pressure measurement by appropriate means.

The object of the present invention is to provide a novel apparatus for the measurement of density, which apparatus is capable of giving results which are compensated for changes in the temperature of measurement. A further object is to provide a method of determining the density of a liquid substantially compensated for changes in the temperature of measurement.

It has been found that when the aforesaid known device is modified by adding a further vessel, called the "compensating vessel," which is disposed on the other tube, the desired compensation may be obtained. The "compensating vessel" is of similar construction to the "reference vessel" and when in use contains the same liquid. When an appropriate reference liquid is employed and the various dimensions of the apparatus are suitably adjusted as hereinafter set forth in detail, a single measurement of a differential pressure gives the density of the liquid tested, when brought to a predetermined temperature.

In accordance, therefore, with the present invention there is provided an apparatus for use in the measurement of the density of a liquid comprising a pair of closed vessels each of which is provided with a gas inlet pipe and a gas outlet pipe whereby each vessel may contain a reference liquid and gas may be introduced into each said vessel through its inlet pipe and pass out of the vessel through its outlet pipe after having passed through said reference liquid, a pressure differential responsive device connected across said inlet pipes so as to measure the difference in pressure between gases in said inlet pipes and container means adapted to contain a liquid whose density is to be measured, said outlet pipes extending into said container means so as to be immersed to different depths in any liquid therein, said container means being provided with a gas outlet. The apparatus preferably includes means for maintaining the temperature of the reference liquid in each of said vessels the same as that of the liquid in said container means.

The term "closed" when applied to vessels as aforementioned in the specification and in the appended claims indicates that the only openings in the vessels are those of the gas inlet and gas outlet.

Referring to Figure 2 of the drawings, the apparatus illustrated comprises a receptacle 10 containing the liquid 11 whose density is to be measured. Closed vessels 14 and 15 are partially disposed within the receptacle 10 and are provided with vertically moveable gas inlet pipes 16 and 17 and vertically moveable gas outlet pipes 12 and 13. The gas inlet pipes pass through the upper ends of the vessels and extend a substantial distance into the vessels. The gas outlet pipes are connected to the vessels at said upper ends, each closed vessel having vertical internal sides, a horizontal bottom and a circular section in plan. Reference liquid 18 is contained in the vessels 14 and 15 and a differential pressure gauge 19 is connected across the inlet pipes.

Figure 3 shows a modification of the apparatus of Figure 2 wherein the liquid whose density is to be measured may be maintained at a constant level. Referring to the figure, a receptacle 20 containing the liquid whose density is to be measured (not shown) is provided with a liquid inlet 21, a liquid outlet 22 and a gas outlet 23. Within the receptacle 20 are disposed closed vessels 24 and 25 having vertical internal walls, horizontal internal bottoms and circular sectional plan, each vessel containing the same reference liquid 26. Inlet pipes 27 and 28, which pass through the upper ends of the vessels 24 and 25, dip into the reference liquid 26. Outlet pipes 29 and 30 are connected to the upper part of the vessels 24 and 25 and dip into the liquid whose density is to be measured. A differential pressure gauge (not shown) is attached across the upper ends of inlet pipes 27 and 28.

A value of the density of a liquid using the above apparatus, especially a value compensated for variations in the temperature of measurement, may be obtained using the relations hereinafter set forth. In the following calculations and relations, the following symbols are employed, which, for illustration, are described with reference to the apparatus shown in Figure 2:

D is the density of the liquid 11 at the temperature at which the measurement is made and $l$ is its coefficient of expansion, $\Delta$ is the density of the reference liquid 18 at the temperature at which it is measured and $\lambda$ is its coefficient of expansion.

P and p are the pressures applied to the inlet pipes 16 and 17 of the two vessels 14 and 15, Q and q are the pressures obtained in the upper chambers of the vessels, H is the difference in the depth of immersion of the ends of the outlet pipes 12 and 13, A and a are the depths of immersion of the ends of the inlet pipes 16 and 17 in the liquid 18, and B and b are the distances between the lower ends of inlet pipes 16 and 17 and the bottom of the vessels.

The same values accompanied by the index 0 relate to the reference temperature.

It will also be assumed that:

$D_0^m$ is the mean density of the liquid 11 at the reference temperature, $d_0$ is the density variation of the liquid 11 at the reference temperature, $d_0^M$ is the maximum value of this variation, and $\theta$ is the difference between the temperature at which the measurement is made and the reference temperature. Now:

$$P-Q=A\Delta \quad p-q=a\Delta \quad Q-q=HD$$

whence:

$$P-p=HD-(a-A)\Delta \quad (1)$$

$P-p$ being measured by the pressure gauge.

Equation 1 therefore enables a density value to be obtained using the apparatus of the invention when the reference liquids in both vessels are the same.

Considering now the effect of temperature on the value of density thus obtained, it is known that:

$$a+b_0=(a_0+b_0)(1+\lambda\theta)$$

i. e.

$$a=a_0+(a_0+b_0)\lambda\theta$$

likewise $$A=A_0+(A_0+B_0)\lambda\theta$$

providing the vessels each have substantially vertical internal walls and a substantially horizontal internal bottom.

The densities D and $\Delta$ are related to the densities $D_0$ and $\Delta_0$ by the equations:

$$D=\frac{D_0}{1+l\theta} \text{ and } \Delta=\frac{\Delta_0}{1+\lambda\theta}$$

or by expanding $$D=D_0(1-l\theta+l^2\theta^2 \ldots)$$

and $$\Delta=\Delta_0(1-\lambda\theta+\lambda^2\theta^2 \ldots)$$

By inserting in (1)

$$P-p=[HD_0-(a_0-A_0)\Delta_0]+\theta[HlD_0+(B_0-b_0)\lambda\Delta_0]+\theta^2 R$$

R being a remainder.

Substitution of $D_0$ in accordance with:

$$D_0=D_0^m+d_0$$

gives:

$$P-p=Hd_0+[HD_0^m-(a_0-A_0)\Delta_0]-\theta l H d_0-$$
$$\theta[HlD_0^m-(B_0-b_0)\lambda\Delta_0]+\theta^2 R \quad (2)$$

In order to effect the best possible compensation for the value $D_0^m$ of $D_0$ (that is to say when $d_0=0$), it is necessary for the second term in $\theta$ in Equation 2 to equal zero.

In which case:

$$B_0-b_0=H\times\frac{lD_0^m}{\lambda\Delta_0} \quad (3)$$

Furthermore since $D_0^m$ is the mean value of $D_0$, which varies from $D_0^m-d_0^M$ to $D_0^m+d_0^M$ if $D_0^m$ is placed at the centre of the differential pressure scale then:

$$P-p=0$$

when $$D_0=D_0^m-d_0^M$$

whence the condition:

$$a_0-A_0=H\times\frac{D_0^m-d_0^M}{\Delta_0} \quad (4)$$

The Equations 3 and 4, in which $b_0$ and $A_0$ are arbitrary (provided that they are positive), determine the depths of immersion of the pipes and the levels of the reference liquid 18 in the vessels, if substantial compensation for variation in temperature is to be obtained.

Since the apparatus is designed to satisfy the relations 3 and 4, the expression 2 of the measured pressure becomes, after all calculations have been made:

$$P-p=H(d_0+d_0^M)-Hld_0\theta+HD_0^M\times\frac{l(l-\lambda)}{(1+\theta l)(1+\theta l)}\times\theta_0$$
$$(5)$$

There remain two terms, in $\theta$ and $\theta^2$ respectively, for which the above described apparatus does not compensate. Their relative degree is, however, less than 1% of the scale of the pressure gauge for appreciable fluctuations of the temperature. Thus, the following will apply in practice:

$$P-p=H(d_0+d_0^M)$$

The measured pressure is therefore proportional to the variations of the density of the liquid brought to the reference conditions.

In accordance therefore with a further feature of the present invention there is provided a method of determining the density of a liquid having a known maximum variation of density ($d_0^M$) at an arbitrary reference temperature about a known mean density value ($D_0^m$) at said reference temperature and having a known coefficient of expansion ($l$), which comprises bubbling two separate streams of gas into the liquid whose density is to be measured, one stream of gas being introduced to a known greater depth (H) than the other and one of said streams of gas, prior to being bubbled through the liquid whose density is to be measured, being bubbled through a known depth ($A_0$, measured at said reference temperature) of a reference liquid having a known density ($\Delta_0$, measured at said reference temperature) and having a known coefficient of expansion ($\lambda$) contained in a closed vessel having substantially vertical internal sides and a substantially horizontal internal bottom to a known depth ($A_0+B_0$, measured at said reference temperature) and the other of said streams of gas, prior to being bubbled through the liquid whose density is to be measured, being bubbled through a known depth ($a_0$, measured at said reference temperature) of a reference liquid of the same constitution as the first-mentioned reference liquid contained in a closed vessel having substantially vertical sides and a substantially horizontal bottom to a known depth ($a_0+b_0$, measured at said reference temperature), said reference liquids being maintained at the same temperature as the liquid whose density is to be determined, said known quantities satisfying the relations;

$$B_0-b_0=H\times\frac{lD_0^m}{\lambda\Delta_0}$$

and $$a_0-A_0=\frac{H(D_0^m-d_0^M)}{\Delta_0}$$

and measuring the pressure differential between the two streams of gas prior to their being bubbled through the reference liquids.

Determinations of density by the method hereinbefore described provide inter alia a useful means of following and regulating the progress of chemical reactions. Thus by following the density changes accompanying chemical reaction, it is possible to terminate the reaction when it has proceeded to any desired extent or to change its speed by appropriate additions to or removals from the reaction mixture. In this regard, the method has especial utility in determining densities of mixtures of water with nitric acid, sulphuric acid or alcohol.

We claim:

Apparatus for use in the measurement of the density of a liquid comprising container means adapted to be filled with liquid whose density is to be measured, a gas outlet for said container means, a pair of closed vessels each having substantially vertical internal sides and a substantially horizontal internal bottom, reference liquid contained in said vessels, which reference liquid is the same for each vessel and is at the same temperature as that of the liquid in said container means, a gas inlet pipe and a gas outlet pipe for each closed vessel such that a gas may be introduced into each said vessel through its inlet pipe and pass out of the vessel through its outlet pipe having passed through said reference liquid, said outlet pipes extending into said container means to different depths in the liquid contained in said container means and a pressure differential responsive device connected across said inlet pipes so as to measure the difference in pressure between the gases in said inlet pipes, the variables hereinafter set forth being adjusted to satisfy the following equations:

$$B_0 - b_0 = H \times \frac{lD_0^m}{\lambda \Delta_0}$$

and $$a_0 - A_0 = H \times \frac{D_0^m - d_0^M}{\Delta_0}$$

wherein $B_0$ and $A_0$ each relate to one vessel and are respectively the vertical height of the end of the gas inlet pipe above the bottom of the vessel and its depth below the surface of the reference liquid in the vessel and $a_0$ and $b_0$ have the same significance as $A_0$ and $B_0$ in relation to the other vessel, $\Delta_0$ is the density of the reference liquid, $D_0^m$ is the mean density of the liquid whose density is to be measured, $d_0^M$ is the maximum value of the variation of the density of the liquid whose density is to be measured from $D_0^m$, each of the aforesaid values being measured at the temperature at which the density is to be determined, H is the vertical height between the ends of the gas outlet pipes and $l$ and $\lambda$ are the coefficients of expansion of the liquid whose density is to be measured and of the reference liquid respectively.

References Cited in the file of this patent

FOREIGN PATENTS 58,072  France _____ May 6, 1953